United States Patent
Harris, Jr. et al.

(10) Patent No.: US 11,024,435 B2
(45) Date of Patent: Jun. 1, 2021

(54) RADIATION-SHIELDING MATERIAL AND MANUFACTURE THEREOF

(71) Applicant: The Boeing Company, Chicago, IL (US)

(72) Inventors: Robert Jerrell Harris, Jr., Madison, AL (US); Dennis Lynn Coad, Madison, AL (US); James Ross Dobbs, Huntsville, AL (US); William Atwell, Houston, TX (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 16/179,828

(22) Filed: Nov. 2, 2018

(65) Prior Publication Data

US 2020/0143951 A1 May 7, 2020

(51) Int. Cl.
  *G21F 1/00* (2006.01)
  *B64G 1/00* (2006.01)
  (Continued)

(52) U.S. Cl.
  CPC ............ *G21F 1/103* (2013.01); *B29C 70/025* (2013.01); *B29C 70/882* (2013.01); *B64G 1/54* (2013.01); *G21F 1/12* (2013.01); *G21F 3/00* (2013.01); *B29K 2031/00* (2013.01); *B29K 2063/00* (2013.01); *B29K 2067/00* (2013.01); *B29K 2075/00* (2013.01); *B29K 2079/00* (2013.01); *B29K 2105/08* (2013.01);
  (Continued)

(58) Field of Classification Search
  CPC .... H01B 1/20; G21F 1/02; G21F 3/00; B29C 70/025; B64G 1/00
  See application file for complete search history.

(56) References Cited

U.S. PATENT DOCUMENTS 4,123,392 A * 10/1978 Hall .................. G21F 1/045
                                                  106/640
5,887,042 A *  3/1999 Akamatsu .......... G21F 5/00
                                                  376/272
(Continued)

FOREIGN PATENT DOCUMENTS

KR     20180090539 A1 *  8/2018
WO   WO 2020/097652 A1 * 11/2018

OTHER PUBLICATIONS

Atwell et al "Metal hydrides, MOF's, and carbon composites as space radiation shielding mitigators", 44th Internation Conference on Environmental Systems Jul. 13-17, 2014, Tucson, Az, Paper No. 103.*

(Continued)

*Primary Examiner* — Mark Kopec
(74) *Attorney, Agent, or Firm* — Kolisch Hartwell, P.C.

(57) ABSTRACT

Radiation-shielding composite materials and their methods of manufacture. Such methods may include adding a metal hydride to a hardenable matrix precursor, adding a reinforcing material to the hardenable matrix precursor, and hardening the matrix precursor to form a composite material that incorporates the reinforcing material and the metal hydride in a solid matrix. The resulting radiation-shielding composite materials are configured to attenuate incident radiation, and may be used in the construction of panels, laminate structures, buildings, and aerospace vehicles, among others.

20 Claims, 4 Drawing Sheets

(51) Int. Cl.
*G21F 1/10* (2006.01)
*G21F 1/12* (2006.01)
*B64G 1/54* (2006.01)
*B29C 70/02* (2006.01)
*B29C 70/88* (2006.01)
*G21F 3/00* (2006.01)
*B29L 31/30* (2006.01)
*B29K 105/16* (2006.01)
*B29K 105/08* (2006.01)
*B29K 63/00* (2006.01)
*B29K 67/00* (2006.01)
*B29K 75/00* (2006.01)
*B29K 31/00* (2006.01)
*B29K 79/00* (2006.01)
*B29K 307/04* (2006.01)
*B29K 503/06* (2006.01)
*B29K 505/00* (2006.01)

(52) U.S. Cl.
CPC ...... *B29K 2105/16* (2013.01); *B29K 2307/04* (2013.01); *B29K 2503/06* (2013.01); *B29K 2505/00* (2013.01); *B29L 2031/3097* (2013.01); *B32B 2307/212* (2013.01); *B32B 2571/00* (2013.01)

(56) References Cited

U.S. PATENT DOCUMENTS

| | | | | |
|---|---|---|---|---|
| 5,952,055 | A * | 9/1999 | Brown, Jr. | C04B 41/009 427/454 |
| 7,250,119 | B2 * | 7/2007 | Sayala | G21F 1/00 252/478 |
| 8,678,322 | B2 * | 3/2014 | Long | B64G 1/54 244/171.7 |
| 2005/0258405 | A1 * | 11/2005 | Sayala | G21F 1/06 252/582 |
| 2010/0084586 | A1 * | 4/2010 | Teodorescu | G21F 3/00 250/516.1 |
| 2013/0095307 | A1 * | 4/2013 | Bennington | G21F 3/025 428/213 |
| 2014/0225039 | A1 * | 8/2014 | Chiang | B05D 1/02 252/478 |
| 2018/0040387 | A1 * | 2/2018 | Washington, II | G21F 3/02 |
| 2018/0075936 | A1 * | 3/2018 | Milstein | G21F 3/025 |

OTHER PUBLICATIONS

Jeon, Sanghwan. et al, "Evaluation of Neutron shielding efficiency of Metal hydrides." Transactions of the Korean Nuclear Society Spring Meeting. May 16-18, 2012, 2 pg.

Rojdev, Kristina. et al, "Hydrogen—and Methane-Loaded Shielding Materials for Mitigation of Galactic Cosmic Rays and Solar Particle Events." Gravitational and Space Research. Jul. 2015. vol. 3 (1), 23 pg.

Atwell, William. et al, "Sub-GLE Solar Particle Events and the Implications for Lightly-Shielded Systems Flown During and Era of Low Solar Activity." Dec. 2015. https://www.researchgate.net/publications/280947503, 13 pg.

Rojdev, Kristina, et al, "Investigation of Lithium Metal Hydride Material for Mitigation of Deep Space Radiation." 46th International Conference of Environmental Systems. Jul. 10-14, 2016, 11 pg.

Venkat, Mani. et al, "Ultra High Molecular Weight Polyethylene (UHMWPE) Fiver Epoxy Composite Hybridized with Gadolinium and Boron Nanoparticles for Radiation Shielding." http://proceedings.spiendigitallibrary.org/. May 1, 2017. Pro Of SPIE vol. 9981 99810D-1, 10 pg.

* cited by examiner

RADIATION-SHIELDING MATERIAL AND MANUFACTURE THEREOF

FIELD

This disclosure relates to methods of manufacturing radiation-shielding composite materials, and the composite materials manufactured thereby. More specifically, the disclosure relates to metal hydride-containing composite materials configured to attenuate incident radiation, and their use in panels, laminate structures, buildings, and aerospace vehicles, among other applications.

INTRODUCTION

"Space radiation" is the combination of ionizing and non-ionizing radiation that naturally originates in outer space. The Earth is protected from most radiation that arrives from outer space by its magnetosphere and its atmosphere. The magnetosphere deflects the majority of energetic particles, and the atmosphere absorbs most of the particles that may penetrate the magnetosphere. Space travel extends beyond the protective shield of Earth's atmosphere, and may result in exposure to larger amounts of space radiation.

In the case of air travel, someone travelling at relatively high altitude, above a portion of the atmospheric shield, may be exposed to slightly increased radiation. Although the effect of a single flight is insignificant, repeated exposure may be of some concern for frequent fliers and crewmembers, which may experience cumulative exposure.

Additionally, radiation exposure may also adversely impact electronic systems, creating electronic noise, signal spikes, single event effects, gate rupture, and the burnout of field effect transistors, among other issues.

As mass is a critical limiting factor in spacecraft (and aircraft) design. The addition of any material solely for the purpose of radiation shielding is considered "parasitic", as such material requires additional volume and fuel but provides no other utility for the craft.

SUMMARY

The present disclosure provides methods of manufacturing radiation-shielding composite materials, and the composite materials manufactured thereby.

In some examples, the disclosure may provide a method of manufacturing a radiation-shielding composite material, where the method may include adding a metal hydride to a hardenable matrix precursor, adding a reinforcing material to the hardenable matrix precursor, and hardening the matrix precursor to form a composite material that incorporates the reinforcing material and the metal hydride in a solid matrix. The resulting solid composite material may be configured to attenuate incident radiation.

In some examples, the disclosure may provide a method of manufacturing a radiation-shielding composite material, where the method may include incorporating a plurality of reinforcing fibers in a hardenable resin, incorporating a metal hydride in the hardenable resin, and curing the hardenable resin to form the radiation-shielding composite material.

In some examples, the disclosure may provide a radiation-shielding composite material, including a plurality of reinforcing fibers disposed in a resin matrix, and a metal hydride disposed in the resin matrix, where the composite material exhibits enhanced radiation shielding.

The disclosed features, functions, and advantages of the disclosed methods and materials may be achieved independently in various examples of the present disclosure, or may be combined in yet other examples, further details of which can be seen with reference to the following description and drawings.

BRIEF DESCRIPTION OF THE DRAWINGS

FIG. 3 depicts a flowchart describing an alternative illustrative method of preparing a radiation-shielding composite material, according to the present disclosure.

DESCRIPTION

The present disclosure is directed to composite materials containing a metal hydride that may provide advantageous radiation attenuation with respect to their weight, as well as exhibiting physical properties that would make the composite materials well-suited for a variety of structural elements.

Although the present disclosure may describe radiation-shielding materials in the context of the aerospace industry, the radiation-shielding materials of the disclosure have applications in a variety of environments including research laboratories, manufacturing facilities, hospitals, power generation, and the like. The present disclosure should not be considered limiting with respect to the applications for the disclosed composite materials for aircraft, spacecraft, or any other aerospace application.

A composite material is typically prepared using two or more constituents having significantly different physical or chemical properties that, when combined, produce a material having physical characteristics different from its individual components. Composite materials remain substantially heterogeneous, with the individual components remaining separate and distinct within the composite material, which differentiates composite materials from both mixtures and solid solutions (such as alloys). The composite materials described herein include one or more reinforcing materials that are added to, and subsequently surrounded by, a fluid or semi-fluid matrix precursor that is then hardened to form a solid matrix that incorporates the reinforcing materials.

The radiation-shielding capability of a composite material may be enhanced by the incorporation of a proton-rich metal hydride 2, as well as an appropriate reinforcing material 4, within a solid matrix material 6. The resulting composite material 8 includes both metal hydride 2 and reinforcing material 4 encapsulated within solid matrix 6.

Figure 1:
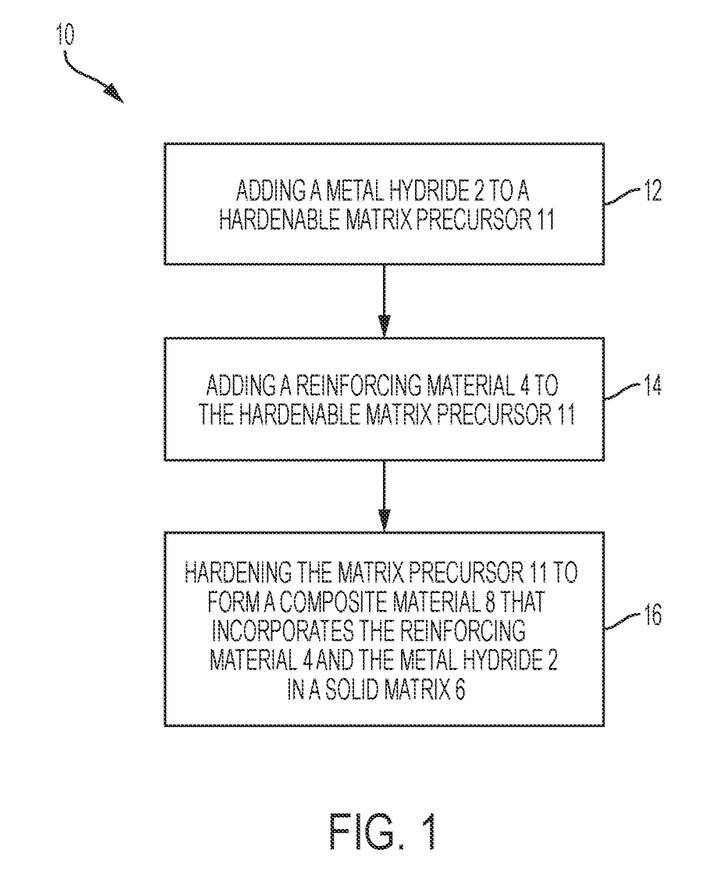
FIG. 1 depicts a flowchart describing an illustrative method of preparing a radiation-shielding composite material, according to the present disclosure.

As shown in method 10 of FIG. 1, a representative method 10 of manufacturing a radiation-shielding composite material 8 includes adding metal hydride 2 to a hardenable matrix precursor 11 at step 12 of method 10. The method 10 also includes adding reinforcing material 4 to the hardenable matrix precursor 11 at step 14 of method 10. The method 10 further includes hardening the matrix precursor 11 to form a composite material 8 that incorporates reinforcing material 4 and metal hydride 2 in a solid matrix 6 at step 16. By virtue of the inclusion of metal hydride 2, the resulting composite material 8 can exhibit an enhanced ability to attenuate incident radiation.

Figure 2:
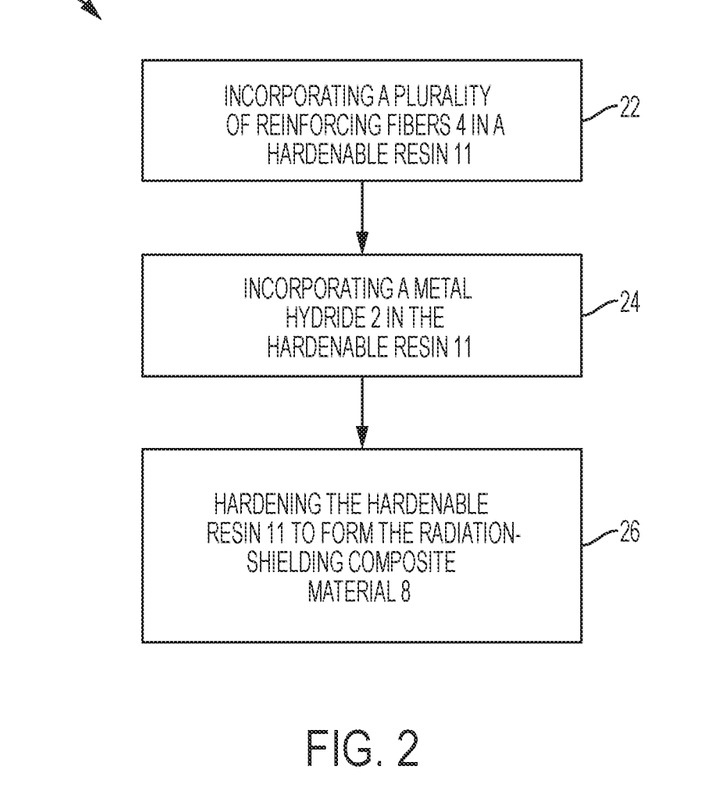

In some aspects of the disclosed method, the hardenable matrix precursor 11 is selected to be a hardenable resin, and reinforcing material 4 is selected to be a plurality of reinforcing fibers. As shown in FIG. 2, this aspect of method 20 of manufacturing a radiation-shielding composite material 8 includes incorporating a plurality of reinforcing fibers 4 in a hardenable resin 11 at step 22 and, incorporating a metal hydride 2 in hardenable resin 11 at step 24. The method 20 further includes hardening the hardenable resin 11 to form the radiation-shielding composite material 8 at step 26. The composite material 8 resulting from method 20 not only exhibits an enhanced ability to attenuate incident radiation, but provides advantages for aerospace applications.

In one aspect, the radiation-shielding composite materials 8 prepared by the disclosed methods 10, 20 include a plurality of reinforcing fibers 4 disposed in a resin matrix 6, and a metal hydride 2 disposed in the resin matrix 6, wherein the composite material 8 can exhibit enhanced radiation shielding, structural strength, and enhanced stiffness while remaining light in weight.

Metal Hydride

Metal hydride compounds suitable for use as metal hydride 2 include at least one metal atom and at least one hydrogen atom, although some metal hydride compounds may include one or more additional elements. Examples of metal hydrides include aluminum hydride, boron hydride, lithium borohydride, and various salts thereof such as, for example, sodium aluminum hydride.

Figure 6:
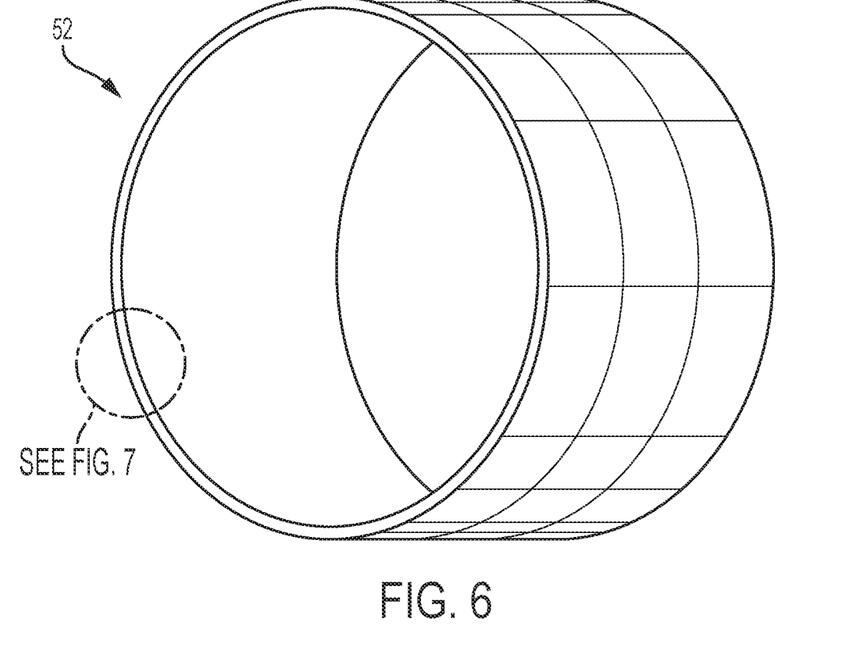
FIG. 6 depicts a portion of an aerospace vehicle skin that incorporates an illustrative radiation-shielding composite material prepared according to the method of FIG. 1 or FIG. 2.
Figure 7:
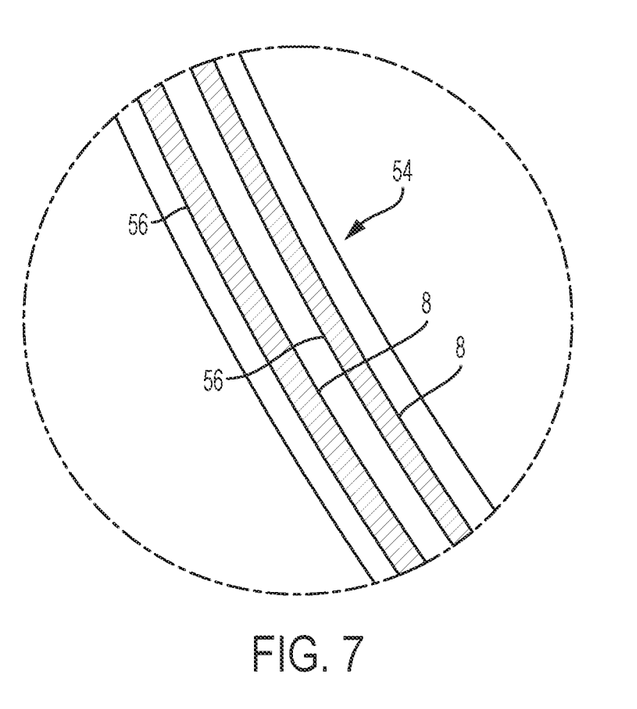
FIG. 7 depicts a detail of the vehicle skin of FIG. 6, showing a multi-layered composite material prepared according to the method of FIG. 1 or FIG. 2.

The selection of a metal hydride for preparing composite material 8 according to the present disclosure may be based upon factors including, but not limited to, cost, availability, and the particular radiation-attenuating properties of a given metal hydride. For terrestrial applications, such as incorporation into a building or other structure, the weight of metal hydride 2 may be relatively low importance, whereas when preparing a composite material 8 that may be used as a structural element of an aircraft or spacecraft, (e.g., as shown in FIGS. 6 and 7) the weight of the composite material 8 may become as important as its radiation shielding efficiency.

A light-weight composite material 8 according to the present disclosure may be prepared, in part, by selection of a metal hydride 2 having a density that is less than the density of the selected matrix precursor 11 after the matrix precursor 11 hardens. The resulting composite material 8 may thereby have a density that is less than a composite material made with the selected matrix precursor 11 and reinforcing materials 4, which can result in a reduction in weight and a simultaneous increase in radiation shielding efficiency.

The shielding capacity of a metal hydride may be evaluated by calculating the hydrogen (proton) equivalents per unit weight of metal hydride 2. The hydrogen content of selected metal hydrides are provided in Table I, below.

TABLE I

Hydrogen Content of Representative Metal Hydrides

| Metal Hydride | Molecular Weight (g/mol) | Moles H/kg |
|---|---|---|
| LiH | 7.95 | 125.8 |
| $BeH_2$ | 11.03 | 181.3 |
| NaH | 24.00 | 41.67 |
| $MgH_2$ | 26.32 | 75.99 |
| KH | 40.11 | 24.93 |
| $CaH_2$ | 42.09 | 47.52 |
| $LiAlH_4$ | 37.95 | 105.4 |

In a particular aspect of method 20, incorporating the metal hydride 2 in the hardenable resin 11 includes incorporating a metal hydride that is selected from alkali metal hydrides and alkaline earth metal hydrides. The various alkali metal hydrides and alkaline earth metal hydrides offer a wide range of chemical and physical properties from which to select a desired metal hydride.

Selection of metal hydride 2 from among lithium hydride, lithium aluminum hydride, beryllium hydride, sodium hydride, magnesium hydride, potassium hydride, and calcium hydride may provide composite materials having enhanced shielding efficiency as a function of weight. In a particular aspect of the disclosure, metal hydride 2 may be selected from among lithium hydride and lithium aluminum hydride, which are both lightweight and relatively inexpensive.

As shown in method 10 of FIG. 1, presently disclosed radiation-shielding composite material 8 may be prepared by adding a selected metal hydride 2 to a hardenable matrix precursor 11 (at step 12), and adding a reinforcing material 4 to the hardenable matrix precursor 11 (at step 14). The disclosed method 10 may be carried out by adding metal hydride 2 to the matrix precursor 11 before reinforcing material 4 is combined with the hardenable matrix precursor 11, or by combining reinforcing material 4 with the hardenable matrix precursor 11 prior to the addition of metal hydride 2. Either order of incorporation is suitable for preparing composite material 8, and each order may offer individual advantages for resulting composite material 8.

Similarly, as shown in method 20 of FIG. 2, presently disclosed radiation-shielding composite material 8 may be prepared by adding a plurality of reinforcing fibers 4 to a hardenable resin 11 (at step 22), and adding a metal hydride 2 to the hardenable resin 11 (at step 24). Disclosed method 20 may be carried out by adding reinforcing fibers 4 to the hardenable resin 11 before metal hydride 2 is combined with hardenable resin 11, or by combining metal hydride 2 with hardenable resin 11 prior to the addition of reinforcing fibers 4. Either order of incorporation is suitable for preparing composite material 8, and each order may offer individual advantages for resulting composite material 8.

Metal hydride 2 may be incorporated into the matrix precursor 11 in any physical form that is appropriate and available, and that is compatible with methods 10 and/or 20. Metal hydride 2 may be embedded in a selected solid matrix 6 as a filler material, and/or could be included as a layer disposed between existing layers of reinforcing material 4 and solid matrix material 6. Where metal hydride 2 is present as a layer, metal hydride 2 may become incorporated into the surrounding solid matrix 6 when pressure is applied during composite manufacturing.

In one aspect of the present methods 10, 20, metal hydride 2 may be dispersed in matrix precursor 11 as a metal hydride powder in order to help avoid layer delamination in resulting composite material 8.

In a particular aspect of method 20, incorporating 24 the metal hydride 2 in hardenable resin 11 includes incorporating nano-particles or micro-particles of the metal hydride 2 in hardenable resin 11. Such metal hydride particles are selected to have a desired size distribution that may be on the order of microns (microparticles) or nanometers (nanoparticles), which facilitates handling of metal hydride 2 during manufacture of radiation-shielding composite material 8.

Metal hydride 2 may be added to matrix precursor 11 after being formed into one or more desired shapes. Many metal hydrides 2 may be obtained in a powder form that can be compressed to create a ceramic-like material. The addition of compressed metal hydride structures to matrix precursor 11 may add additional strength to the resulting composite material 8 when placed under compression.

In an particular aspect of method 20, incorporating metal hydride 2 in the hardenable resin 11 includes incorporating the metal hydride in a form of tubes, fibers, whiskers, plates, screens, cloths, films, or foils in hardenable resin 11. Selection of a physical configuration of metal hydride 2 confers customizable physical properties on the resulting composite materials, as well as permitting tuning of its radiation-shielding properties.

When a selected metal hydride exhibits chemical reactivity matrix precursor 11 may be selected, at least in part, so that metal hydride 2 may be fully encapsulated and/or immobilized within the resulting solid matrix 6, preventing undesired reactions. For example, by encapsulating a water-sensitive metal hydride within a hardened solid matrix 6, metal hydride 2 may become inaccessible to, and therefore unavailable for reaction with, ambient water molecules. Alternatively or in addition, by immobilizing metal hydride 2 within solid matrix material 6, the kinetics of an undesirable reaction may be slowed sufficiently that the reaction is no longer problematic over the lifetime of composite material 8.

The chemical reactivity of metal hydride 2 may also be of concern during the preparation of composite material 8. In this case it may be useful to purge the selected matrix precursor 11 of oxygen and/or water prior to incorporating metal hydride 2.

Additionally, addition of metal hydride 2 may occur in an environment that has been scrubbed of water or oxygen, such as under a dry inert gas atmosphere.

Matrix Precursor

Matrix precursor 11 is a hardenable material that is physically and chemically compatible with both reinforcing material 4 and metal hydride 2. Matrix precursor 11 may initially be semifluid, so that matrix precursor 11 can flow around and encapsulate both reinforcing material 4 and metal hydride 2 when combined. Matrix precursor 11 may then be hardened to fix metal hydride 2 and reinforcing material 4 in place within solid matrix 6, creating a strong composite material that exhibits radiation shielding capability.

Matrix precursor 11 may be selected to be hardenable, or curable, by any suitable means, including the addition of an appropriate additive, exposure to an appropriate wavelength of radiation, or the passage of time, among other treatments.

Cement may be an appropriate matrix material when used in combination with an appropriate reinforcing material 4. In a particular aspect of method 10, hardening matrix precursor 11 to form the composite material 8 includes forming a radiation-shielding concrete composite material. More specifically, the addition of water to Portland cement creates a matrix precursor 11 that will cure with time into a strong and durable solid matrix 6, and the addition of appropriate reinforcing materials 4 and desired metal hydride 2 to the concrete produces concrete formulations suitable for construction projects, and that exhibit enhanced radiation shielding relative to unmodified concrete formulations.

In a particular aspect of method 10, hardening matrix precursor 11 to form the composite material 8 includes forming reinforced masonry, forming a reinforced polymer, forming a ceramic metal composite, or forming a mixed metal composite. The use of such inorganic matrices provides composite materials that are fire-resistant.

Some matrix precursor materials 11 may be inorganic materials rendered at least semifluid by heating, such as a conventional or a borosilicate glass, or a metal or metal alloy, provided that the metal hydrides 2 and reinforcing materials 4 used to prepare composite material 8 are capable of withstanding the heat of the matrix precursor 11 during manufacture.

The selected matrix precursor 11 may be a hardenable resin, or polymeric plastic. A variety of hardenable resins 11 may be suitable for preparing composite material 8, including thermosetting polymers and thermoplastic polymers.

Thermosetting polymers may be liquid or semi-liquid, but an appropriate curing process may render the polymers solid by creating crosslinking between polymer chains, or by extending the length of polymer chains. This curing process is a chemical change and is typically irreversible. Thermosetting plastics may require an appropriate curing agent, which may include heating, suitable wavelengths of radiation, the application of high pressure, electron-beam (E-beam) curing, or the addition of an appropriate catalyst. Selected thermosetting polymers having advantageous properties include acrylic resins, epoxy resins, polyurethanes, and phenolic resins, among others.

Thermoplastic polymers are typically high molecular weight polymers that may be rendered at least semi-fluid by heating to above the glass transition temperature of the polymer, but below the melting point of the polymer, where the plastic may be shaped. Upon cooling to a temperature below its glass transition temperature, the thermoplastic hardens. A variety of thermoplastic polymers are known, and specific formulations may be selected to achieve a desired combination of physical and/or chemical properties. Selected thermoplastic polymers may include acrylonitrile butadiene styrene (ABS); polyamides, such as Nylon and including Nylon-6,6; polybenzimidazole (PBI); polycarbonates, such as LEXAN; Polyether sulfone (PES); polyether ether ketone (PEEK); polyether ketone ketone (PEKK); polyetherimide (PEI); polyethylene, including ultra-high molecular weight polyethylene (UHMWPE); high-density polyethylene (HDPE), medium-density polyethylene (MDPE), low-density polyethylene (LDPE); cross-linked polyethylene (XLPE or PEX); polyphenylene oxide (PPO); polyphenylene sulfide (PPS); polypropylene (PP); polystyrene; polyvinyl chloride (PVC); fluoropolymers, including polytetrafluoroethylene (PTFE), polyvinyl fluoride (PVF), and polyvinylidene fluoride (PVDF), among others. Additionally, thermoplastic polymers intended for applications that involve very low or very high temperatures, such as for cooling and/or heating, or various aerospace applications, may include cross-linked polyethylene polymers, among others.

In one aspect of the disclosure, advantageous matrix materials for preparing radiation-shielding composite materials include plastics such as epoxy resins, phenolic resins, polyester resins, polyurethane resins, vinyl ester resins, and bismaleimide resins, among others. These plastic resins provide a strong and hard solid matrix 6 upon curing.

In a particular aspect of method 20, incorporating metal hydride 2 in hardenable resin 11 includes adding metal hydride 2 to hardenable resin 11 before the plurality of reinforcing fibers 4 is incorporated into hardenable resin 11. Incorporating metal hydride 2 in hardenable resin 11 prior to adding reinforcing fibers 4 helps avoid subsequent layer delamination in the resulting composite material 8.

In another aspect of method 20, incorporating the metal hydride 2 in hardenable resin 11 includes incorporating metal hydride 2 in a thermoset resin. The use of a thermoset resin rather than a thermoplastic polymer results in an irreversible hardening of the solid matrix 6.

Reinforcing Material

The composite materials of the present disclosure may employ any suitable and compatible reinforcing material 4 to confer desirable physical properties onto composite material 8. Rocky aggregate may be used as a reinforcing material for a cement matrix when forming a concrete composite material. Alternatively, or in addition, organic materials such as chips or sawdust may be employed as reinforcing materials for composite material 8.

The presently disclosed composite materials may include one or more reinforcing materials 4 that may be or include metal powders and/or particulates, selected so that the resulting "high gravity" composite materials exhibit increased density. Additionally, such metal-containing composite materials may additionally provide additional attenuation of high energy electromagnetic radiation (i.e., gamma rays and x-rays).

A selected reinforcing material 4 may be uniform or non-uniform in size, shape, and/or in composition. Reinforcing materials 4 may be added to a matrix precursor 11 in any suitable form or configuration, including flakes, chips, or aggregates, among others. However, reinforcing materials 4 that include threads, strands, or fibers may add rigidity to composite material 8, as well as impeding crack propagation and conferring other positive physical characteristics.

Fiber-reinforced composite materials may include short-fiber reinforcing materials and/or continuous-fiber reinforced materials. Continuous-fiber reinforcing materials may include layered or laminated structures, and woven and/or continuous fibers may be employed as uni-directional tapes, woven materials, braided materials, and stitched materials, among others.

Where a reinforcing material 4 is flexible, such as some woven materials, and solid matrix 6 retains some flexibility after curing, resulting composite material 8 may also be capable of some flexibility. Such composite materials may be used where it may be advantageous for composite material 8 to conform to another surface.

The selected reinforcing fibers 4 of composite material 8 may be polymer-based, including polyester polymers such as polyethylene, or polyamide polymers such as poly-aramid, among others. Alternatively, the fibers may be derived from natural sources, such as plants, for example flax, hemp, or agave, among others. The fibers may be or include glass fibers or fused quartz fibers. The fibers may include filamentary crystals, or continuous fibers of refractory compounds. The fibers may include asbestos fibers, beryllium fibers, beryllium carbide fibers, or beryllium oxide fibers. The fibers may include boron fibers or boron nitride fibers. In one illustrative example the fibers may include carbon fibers, such as graphite fibers.

In a particular aspect of method 10, hardening matrix precursor 11 to form the composite material 8 includes forming a radiation-shielding carbon fiber composite material. Composite materials that incorporate carbon fibers as reinforcing materials 4 exhibit numerous advantageous properties, including an excellent strength to weight ratio, compatibility with a variety of other materials, resistance to fatigue, high material stiffness, high heat tolerance, and corrosion resistance, among others.

In a selected aspect of the present disclosure, composite material 8 includes reinforcing material 4 that include carbon fibers, solid matrix material 6 that includes a thermoset resin, and metal hydride 2 that includes lithium hydride. The selection of individually advantageous components yields a radiation-shielding composite material that exhibits a combination of their advantageous properties.

In another aspect of the present disclosure, composite material 8 may include aramid fibers and/or carbon fibers disposed in an epoxy resin matrix material, yielding particularly strong composite materials.

In a particular aspect of method 20, incorporating the plurality of reinforcing fibers 4 in hardenable resin 11 includes incorporating one or more fibers selected from synthetic polymer fibers, natural fibers derived from plant sources, carbon fibers, boron fibers, and boron nitride fibers. The use of such fiber materials adds rigidity and helps limit crack propagation.

Composite Manufacture

The composite materials of the present disclosure may be manufactured using any suitable manufacturing method suitable for other previously described composite materials, provided they are modified when necessary in order to accommodate the presence of incorporated metal hydride.

Suitable composite material fabrication methods may include hand layup, open contact molding, resin transfer molding (RTM), reaction injection molding (RIM), vacuum-assisted resin transfer molding (VARTM), and resin film infusion (RFI), among others.

Alternatively, or in addition, automated and/or high-speed manufacturing methods for composite materials may include compression molding, injection molding, filament winding, pultrusion, extrusion, tube rolling, automated fiber placement (AFP), automated tape laying (ATL), and centrifugal casting, among others.

Radiation Attenuation

Radiation attenuation measures how easily incident particles or radiation penetrates a given volume of a shielding material. The ability of a shielding material to attenuate incident ration may be quantified as the "attenuation coefficient" of that material. A large attenuation coefficient indicates that the incident radiation is quickly attenuated, or weakened, as the radiation passes through the shielding material, while a small attenuation coefficient indicates that the shielding material is relatively transparent to the incident radiation. The SI unit for the attenuation coefficient is the reciprocal meter ($m^{-1}$).

Radiation attenuation follows an exponential law and may be described in terms of the half-value layer for a given shielding material, which is the thickness of shielding material that reduces the incident radiation to 50% of its original value. That is, one half-value thickness of shielding will reduce the radiation by half of its initial intensity. Two half-value layers will reduce the radiation to one-quarter, and three half-value layers will reduce the radiation to one-eighth of its original intensity.

Figure 3:
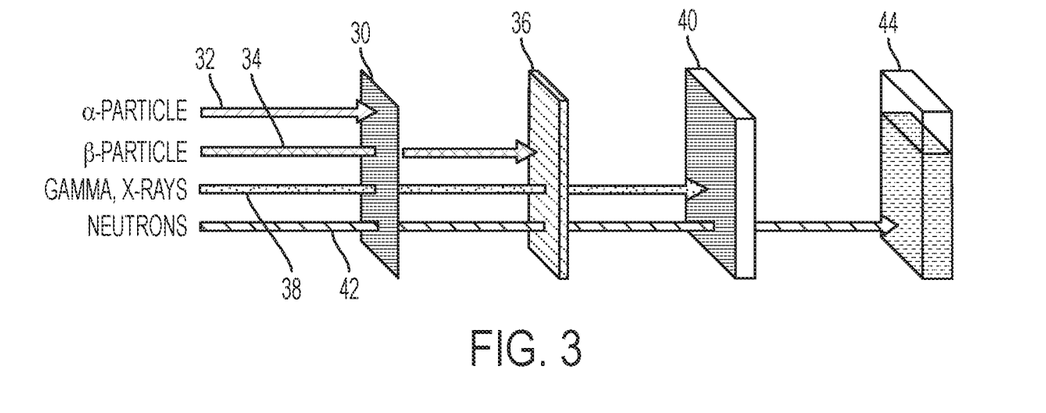
FIG. 3 depicts relative radiation attenuation for various shielding materials and various types of radiation.

The type of radiation shielding required for a given application will depend upon the particular type(s) of incident radiation to be blocked. As depicted schematically in FIG. 3, different shielding materials are effective for blocking different types of radiation. A sheet of paper 30 may be sufficient to block alpha-particle radiation 32, while beta-particle radiation 34 may require a thin sheet of aluminum 36 or somewhat thicker plastic shielding material. Gamma and x-ray radiation 38 may require more substantial shielding yet, such as thick lead, iron, or concrete 40. Due to its very high energy, neutron radiation 42 is considered to present a high exposure risk, and may require a thick barrier of a hydrogen-rich material 44 to provide suitably effective shielding. This hydrogen-rich material may include water, an organic polymer, or a water-rich concrete formulation.

Composite material 8 of the present disclosure may provide enhanced radiation attenuation, including neutron radiation attenuation. A composite material may be said to provide enhanced neutron radiation shielding when the composite material exhibits increased attenuation of neutron radiation by the composite material when compared to the neutron radiation attenuation observed for an equivalent composite material of the same thickness in the absence of added metal hydride 2.

An equivalent composite material is a composite material having substantially the same formulation and composition of solid matrix 6, substantially the same composition and amount of reinforcing material 4, and substantially the same dimensions (particularly thickness) as composite material 8, but does not include corresponding metal hydride 2. This equivalent composite material without metal hydride component 2 may also be referred to herein as a "control" composite material.

Composite material 8 may be configured so that it may provide attenuation of incident radiation sufficiently to substantially reduce the risk of harmful effects due to radiation exposure for life forms disposed within an area shielded by the composite material. Alternatively, or in addition, composite material 8 may be configured so that it provides a radiation shielding effect required by one or more safety protocols established by a governing organization.

Composite material 8 may be configured and formulated to reduce (or attenuate) the amount of neutron radiation transmitted through the material by at least 50% relative to the amount of neutron radiation transmitted through an equivalent control composite material. Preferably, composite material 8 may reduce the amount of neutron radiation transmitted through the material by at least 90% relative to the amount of neutron radiation transmitted through an equivalent control composite material.

In one example, composite material 8 may be formulated so that they are capable of attenuating at least 90% of the average radiation experienced in a low Earth orbit, where such radiation arises from natural sources such as galactic cosmic radiation and solar particle events, making them particularly useful as shielding materials for aerospace applications.

Most preferably, composite material 8 may be configured to block substantially all incident neutron radiation, within the detection ability of the instrument or instruments used to make the radiation measurement.

Applications

Composite material 8 may be used in any application where attenuation of radiation is desirable, particularly neutron radiation. Additionally, composite material 8 may be formulated to exhibit desired physical properties, such as enhanced tensile strength, increased density, torsion resistance, compression resistance, and low weight, among others.

Composite material 8 may be used as radiation shielding in construction, for example in laboratories employing radiation sources, hospitals employing radiation treatment, or in buildings or power plants that require radiation shielding for sensitive electronics. Even relatively low-radiation environments, such as long-range missiles, satellites, military aircraft, and commercial airliners may benefit from the lightweight radiation protection made possible by the presently disclosed composite materials.

Composite material 8 may be incorporated into a radiation-shielding panel that may in turn be employed in construction of a shielding structure, or as a structural element of a building or a vehicle. Composite material 8 may be incorporated into the radiation-shielding panel or other structure in multiple distinct layers, where the presence of multiple layers may enhance the radiation attenuation of the multilayer structure.

Figure 4:
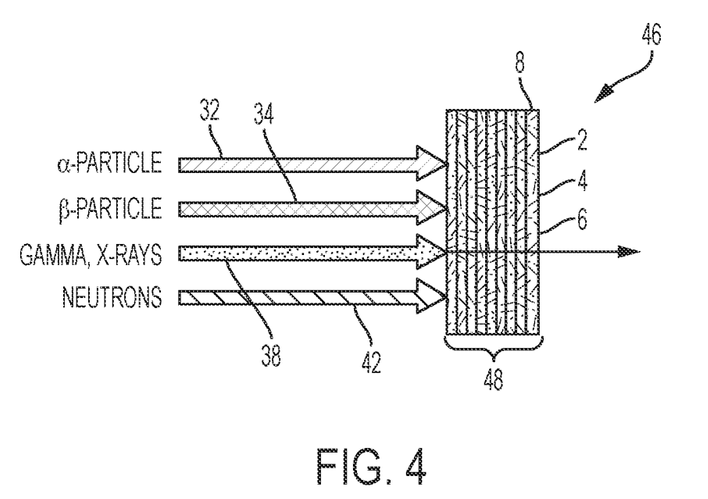
FIG. 4 depicts an illustrative multi-layered composite material prepared according to the method of FIG. 1 or FIG. 2, and a representation of the composite material's ability to attenuate various types of radiation.

For example as depicted in FIG. 4, a structure 46 incorporating multiple individual layers 48 of composite material 8 may efficiently block alpha-particle radiation 32, beta-particle radiation 34, and neutron radiation 42, and substantially attenuate incident high-energy radiation such as gamma rays and X-ray radiation 38.

Figure 5:
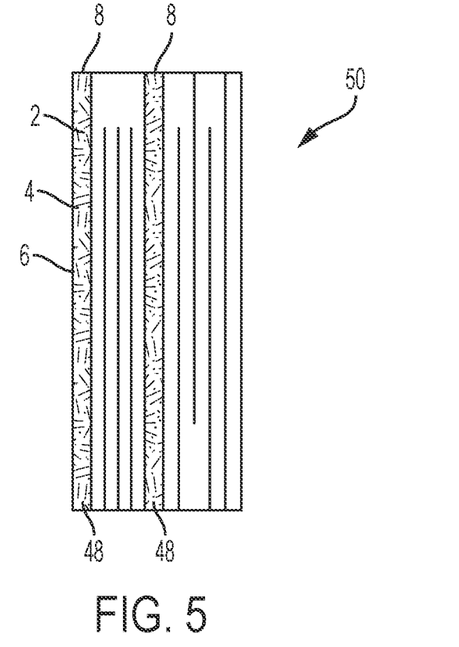
FIG. 5 depicts an illustrative multiple layered laminate structure that includes composite materials prepared according to the method of FIG. 1 or FIG. 2.

The radiation-shielding properties of composite material 8 may alternatively or additionally be combined with the physical properties of other materials by creating laminate structures that incorporate the composite material 8. For example as shown in FIG. 5 a multi-layered material 50 incorporates two individual layers 48 of composite material 8 according to the present disclosure. Such mixed-composition layered structures may provide enhanced radiation shielding properties without, for example, incurring the cost of manufacturing the entire structure from the selected composite material.

The manufacture of materials according to the methods of FIG. 1 and/or FIG. 2 may result in lightweight, strong, and highly radiation-shielding composite materials that are well-suited for use in preparing a structural element of a building or a vehicle. Such structural elements have particular utility in aerospace applications, particularly in constructing aircraft, spacecraft, and/or habitat structures in space or on other bodies in the solar system. For example, FIG. 6 depicts a portion of a fuselage 52 of an aerospace vehicle such as an aircraft or spacecraft. As shown, fuselage 52 may incorporate a structural panel 54 that incorporates one or more layers 56 of composite material 8, as shown in greater detail in FIG. 7.

The disclosed composite materials may be advantageously incorporated into the skin of an aerospace vehicle and/or the interior panels of the aerospace vehicle, or both, thereby providing structural elements that additionally exhibit radiation attenuation properties. For space vehicles it may be advantageous to include composite material 8 throughout the entire structure of the spacecraft (e.g., framework, ribs, skin, etc.).

The following section describes additional aspects and features of the disclosed methods of manufacturing radiation-shielding composite material 8, and the composite material 8 itself, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A method of manufacturing a radiation-shielding composite material, the method comprising: adding a metal hydride to a hardenable matrix precursor; adding a reinforcing material to the hardenable matrix precursor; and hardening the matrix precursor to form a composite material that incorporates the reinforcing material and the metal hydride in a solid matrix; wherein the composite material is configured to attenuate incident radiation.

A2. The method of paragraph 1, wherein hardening the matrix precursor to form the composite material includes forming reinforced masonry, forming a reinforced polymer, forming a ceramic metal composite, or forming a mixed metal composite.

A3. The method of paragraph 1, wherein hardening the matrix precursor to form the composite material includes forming a radiation-shielding concrete composite material.

A4. The method of paragraph 1, wherein hardening the matrix precursor to form the composite material includes forming a radiation-shielding carbon fiber composite material.

B1. A method of manufacturing a radiation-shielding composite material, the method comprising: incorporating a plurality of reinforcing fibers in a hardenable resin; incorporating a metal hydride in the hardenable resin; and hardening the hardenable resin to form the radiation-shielding composite material.

B2. The method of paragraph B1, wherein incorporating the metal hydride in the hardenable resin includes adding the metal hydride to the hardenable resin before the plurality of reinforcing fibers is incorporated into the hardenable resin.

B3. The method of paragraph B1, wherein incorporating the metal hydride in the hardenable resin includes incorporating the metal hydride in a thermoset resin.

B4. The method of paragraph B1, wherein incorporating the plurality of reinforcing fibers in the hardenable resin includes incorporating one or more fibers selected from synthetic polymer fibers, natural fibers derived from plant sources, carbon fibers, boron fibers, and boron nitride fibers.

B5. The method of paragraph B1, wherein incorporating the metal hydride in the hardenable resin includes incorporating a metal hydride that is selected from alkali metal hydrides and alkaline earth metal hydrides.

B6. The method of paragraph B1, wherein incorporating the metal hydride in the hardenable resin includes incorporating nano-particles or micro-particles of the metal hydride in the hardenable resin.

B7. The method of paragraph B1, wherein incorporating the metal hydride in the hardenable resin includes incorporating the metal hydride in a form of tubes, fibers, whiskers, plates, screens, cloths, films, or foils in the hardenable resin.

C1. A radiation-shielding composite material, comprising: a plurality of reinforcing fibers disposed in a resin matrix; and a metal hydride disposed in the resin matrix; wherein the composite material exhibits enhanced radiation shielding.

C2. The composite material of paragraph C1, wherein the resin matrix includes one or more of an epoxy resin, a phenolic resin, a polyester resin, a polyurethane resin, a vinyl ester resin, and a bismaleimide resin.

C3. The composite material of paragraph C1, wherein the metal hydride includes one or more of lithium hydride, beryllium hydride, sodium hydride, magnesium hydride, potassium hydride, and calcium hydride.

C4 The composite material of paragraph C1, wherein the plurality of reinforcing fibers include carbon fibers, the resin matrix is a thermoset resin; and the metal hydride includes lithium hydride.

C5. The composite material of paragraph C1, wherein the composite material is capable of attenuating at least 90% of an average radiation exposure in a low Earth orbit arising from galactic cosmic radiation and solar particle events.

C6. A radiation-shielding panel comprising the composite material of paragraph C1.

C7. A multiple-layered laminate structure comprising at least one layer including the radiation-shielding panel of paragraph C6.

C8. A structural element of a building or a vehicle comprising the composite material of paragraph C1.

C9. A component of an aerospace vehicle comprising the composite material of paragraph C1.

ADVANTAGES, FEATURES, BENEFITS

The present disclosure provides composite materials that may be light in weight, provide enhanced structural properties, and effectively attenuate incident radiation.

The disclosed composite materials allow for a lighter yet more robust approach to radiation protection, and their capacity for combining radiation attenuation efficiency and advantageous structural properties may become increasingly critical as future extended space missions venture further from Earth

CONCLUSION

Various examples of metal hydride-containing composite materials, and their preparation, are described herein and illustrated in the associated drawings. Unless otherwise specified, the composite materials, their various components, and/or their manufacture may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar composite materials. The description of various embodiments is merely exemplary in nature and is in no way intended to limit the disclosure, its application, or uses. Additionally, the advantages provided by the examples are illustrative in nature and not all examples provide the same advantages or the same degree of advantages.

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A radiation-shielding panel for a skin of an aircraft, the radiation-shielding panel comprising a composite material that comprises:
   a plurality of reinforcing fibers, located in a resin matrix; and
   a metal hydride, located in the resin matrix;
   wherein the plurality of reinforcing fibers and the metal hydride are encapsulated within the resin matrix, and the composite material exhibits enhanced radiation shielding.

2. The composite material of claim 1, wherein the metal hydride has a particle size distribution on an order of microns or nanometers.

3. The composite material of claim 1, wherein the resin matrix comprises one or more of an epoxy resin, a phenolic resin, a polyester resin, a polyurethane resin, a vinyl ester resin, and a bismaleimide resin.

4. The composite material of claim 1, wherein the metal hydride comprises one or more of lithium hydride, beryllium hydride, sodium hydride, magnesium hydride, potassium hydride, and calcium hydride.

5. The composite material of claim 1, wherein the plurality of reinforcing fibers comprise carbon fibers, the resin matrix is a thermoset resin; and the metal hydride comprises lithium hydride.

6. The composite material of claim 1, wherein the composite material is capable of attenuating at least 90% of an average radiation exposure in a low Earth orbit arising from galactic cosmic radiation and solar particle events.

7. A multiple-layered laminate structure comprising at least one layer including the radiation-shielding panel of claim 1.

8. A method of manufacturing a radiation-shielding composite panel for a skin of an aircraft, the method comprising:
   adding a metal hydride to a matrix precursor that is hardenable;
   adding reinforcing fibers to the matrix precursor; and
   hardening the matrix precursor to form a composite material that incorporates the reinforcing fibers and the metal hydride in a solid matrix;
   wherein the composite material is configured to attenuate incident radiation.

9. The method of claim 8, wherein hardening the matrix precursor to form the composite material comprises forming reinforced masonry, forming a reinforced polymer, forming a ceramic metal composite, or forming a mixed metal composite.

10. The method of claim 8, wherein hardening the matrix precursor to form the composite material comprises forming a radiation-shielding concrete composite material.

11. The method of claim 8, wherein hardening the matrix precursor to form the composite material comprises forming a radiation-shielding carbon fiber composite material.

12. A method of manufacturing a radiation-shielding composite panel for a skin of an aircraft, the method comprising:
   incorporating a plurality of reinforcing fibers in a hardenable resin;
   incorporating a metal hydride in the hardenable resin; and
   hardening the hardenable resin to form the radiation-shielding composite panel;
   wherein the plurality of reinforcing fibers and the metal hydride are immobilized within the hardenable resin.

13. The method of claim 12, wherein incorporating the metal hydride in the hardenable resin comprises adding the metal hydride to the hardenable resin under a dry inert gas atmosphere.

14. The method of claim 12, wherein incorporating the metal hydride in the hardenable resin comprises dispersing the metal hydride in the hardenable resin as a metal hydride powder.

15. The method of claim 12, wherein incorporating the metal hydride in the hardenable resin comprises adding the metal hydride to the hardenable resin before the plurality of reinforcing fibers is incorporated into the hardenable resin.

16. The method of claim 12, wherein incorporating the metal hydride in the hardenable resin comprises incorporating the metal hydride in a thermoset resin.

17. The method of claim 12, wherein incorporating the plurality of reinforcing fibers in the hardenable resin comprises incorporating one or more fibers selected from synthetic polymer fibers, natural fibers derived from plant sources, carbon fibers, boron fibers, and boron nitride fibers.

18. The method of claim 12, wherein incorporating the metal hydride in the hardenable resin comprises incorporating a metal hydride that is selected from alkali metal hydrides and alkaline earth metal hydrides.

19. The method of claim 12, wherein incorporating the metal hydride in the hardenable resin comprises incorporating nano-particles or micro-particles of the metal hydride in the hardenable resin.

20. The method of claim 12, wherein incorporating the metal hydride in the hardenable resin comprises incorporating the metal hydride in a form of tubes, fibers, whiskers, plates, screens, cloths, films, or foils in the hardenable resin.

* * * * *